(12) United States Patent
Smith et al.

(10) Patent No.: US 7,206,878 B2
(45) Date of Patent: Apr. 17, 2007

(54) VOLTAGE LEVEL BUS PROTOCOL FOR TRANSFERRING DATA

(75) Inventors: Jack R Smith, South Burlington, VT (US); Sebastian R Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 10/248,314

(22) Filed: Jan. 8, 2003

(65) Prior Publication Data

US 2004/0133723 A1  Jul. 8, 2004

(51) Int. Cl.
G06F 13/42 (2006.01)

(52) U.S. Cl. ...................... 710/105; 710/110
(58) Field of Classification Search ........... 710/105, 710/110; 326/63, 199, 202; 307/10.3; 327/333
See application file for complete search history.

(56) References Cited

U.S. PATENT DOCUMENTS

| | | | | |
|---|---|---|---|---|
| 3,621,288 A | * | 11/1971 | Brown | 327/408 |
| 4,131,761 A | * | 12/1978 | Giusto | 370/527 |
| 4,376,306 A | * | 3/1983 | Giusto | 370/527 |
| 4,423,506 A | * | 12/1983 | Kawasaki et al. | 370/221 |
| 4,476,527 A | * | 10/1984 | Clayton, IV | 710/29 |
| 4,701,878 A | * | 10/1987 | Gunkel et al. | 710/104 |
| 4,903,230 A | * | 2/1990 | Kaplan et al. | 710/104 |
| 5,003,457 A | * | 3/1991 | Ikei et al. | 700/4 |
| 5,307,475 A | * | 4/1994 | Lau | 710/100 |
| 5,566,088 A | * | 10/1996 | Herscher et al. | 702/123 |
| 5,636,342 A | * | 6/1997 | Jeffries | 714/48 |
| 5,790,293 A | * | 8/1998 | Frigo | 398/33 |
| 5,867,535 A | * | 2/1999 | Phillips et al. | 375/295 |
| 5,928,344 A | * | 7/1999 | Stierli | 710/105 |
| 5,974,519 A | * | 10/1999 | Cho | 711/202 |
| 5,983,024 A | * | 11/1999 | Fye | 710/36 |
| 6,009,479 A | * | 12/1999 | Jeffries | 710/8 |
| 6,173,349 B1 | * | 1/2001 | Qureshi et al. | 710/110 |
| 6,539,443 B1 | * | 3/2003 | Dunstan et al. | 710/106 |
| 6,564,278 B1 | * | 5/2003 | Olson | 710/301 |
| 6,584,535 B1 | * | 6/2003 | Ouellet et al. | 710/305 |
| 6,745,270 B1 | * | 6/2004 | Barenys et al. | 710/104 |
| 6,760,797 B1 | * | 7/2004 | Kim | 710/107 |

OTHER PUBLICATIONS

Texas Instruments Inc., "The TTL Data Book for Design Engineers", 1976, Texas Instruments Inc., 2nd Ed., p. 7-467.*

* cited by examiner

*Primary Examiner*—Khanh Dang
(74) *Attorney, Agent, or Firm*—W. Riyon Harding

(57) ABSTRACT

A bus protocol that allows a master to transfer the same data to multiple devices at the same time. More specifically, the bus protocol uses a particular voltage level to identify whether a device should receive the data. A controller is used for programming the voltage levels for the various devices.

19 Claims, 3 Drawing Sheets

VOLTAGE LEVEL BUS PROTOCOL FOR TRANSFERRING DATA

BACKGROUND OF INVENTION

1. Technical Field

The present invention generally relates to buses, and more particularly, to buses that use varying voltage levels to communicate with various devices.

2. Related Art

Today's complex circuits and systems are often required to communicate with multiple devices during any given moment in time. This communication has typically been handled using a group of wires often referred to as a bus. There are various schemes for using a bus for communication of data, but nearly all of them involve assigning a unique address/identification to each device, an arbiter, and a master.

In general, the arbiter is responsible for receiving all the requests to use the bus, and determining which request to allow to proceed first (master). The addresses are used to determine which of the devices should receive the data currently being transmitted on the bus. The amount of time required to request permission for control over the bus from the arbiter (request cycle) can consume a significant amount of cycle bandwidth, particularly when multiple devices residing on the bus require the same data.

The significance of the overhead for such a request cycle is most notable in clusters of processors having their own submemory. Each of these clusters will often have common copies of code. Over time, the operating system will need to initialize/update these common sections of code, and the overhead of stepping through the clusters for this update can be a bottleneck for overall system performance.

It would, therefore, be a distinct advantage to have a bus protocol capable of transmitting the same data to multiple devices without the overhead of the request cycle scheme described above. The present invention provides such a bus protocol.

SUMMARY OF INVENTION

The present invention is a bus protocol that allows a master to transfer the same data to multiple devices at the same time. More specifically, the bus protocol uses a particular voltage level to identify whether a device should receive the data. A controller is used for programming the voltage levels for the various devices.

BRIEF DESCRIPTION OF DRAWINGS

The present invention will be better understood and its numerous objects and advantages will become more apparent to those skilled in the art by reference to the following drawings, in conjunction with the accompanying specification, in which.

DETAILED DESCRIPTION

In the following description, well-known circuits have been shown in block diagram form in order not to obscure the present invention in unnecessary detail. For the most part, details concerning timing considerations and the like have been omitted inasmuch as such details are not necessary to obtain a complete understanding of the present invention, and are within the skills of persons of ordinary skill in the relevant art.

The present invention uses varying voltage levels in lieu of an address to identify one or more devices for receiving data transmitted on a bus. The devices are dynamically programmed using a controller as described in connection with FIG. 1.

Figure 1:
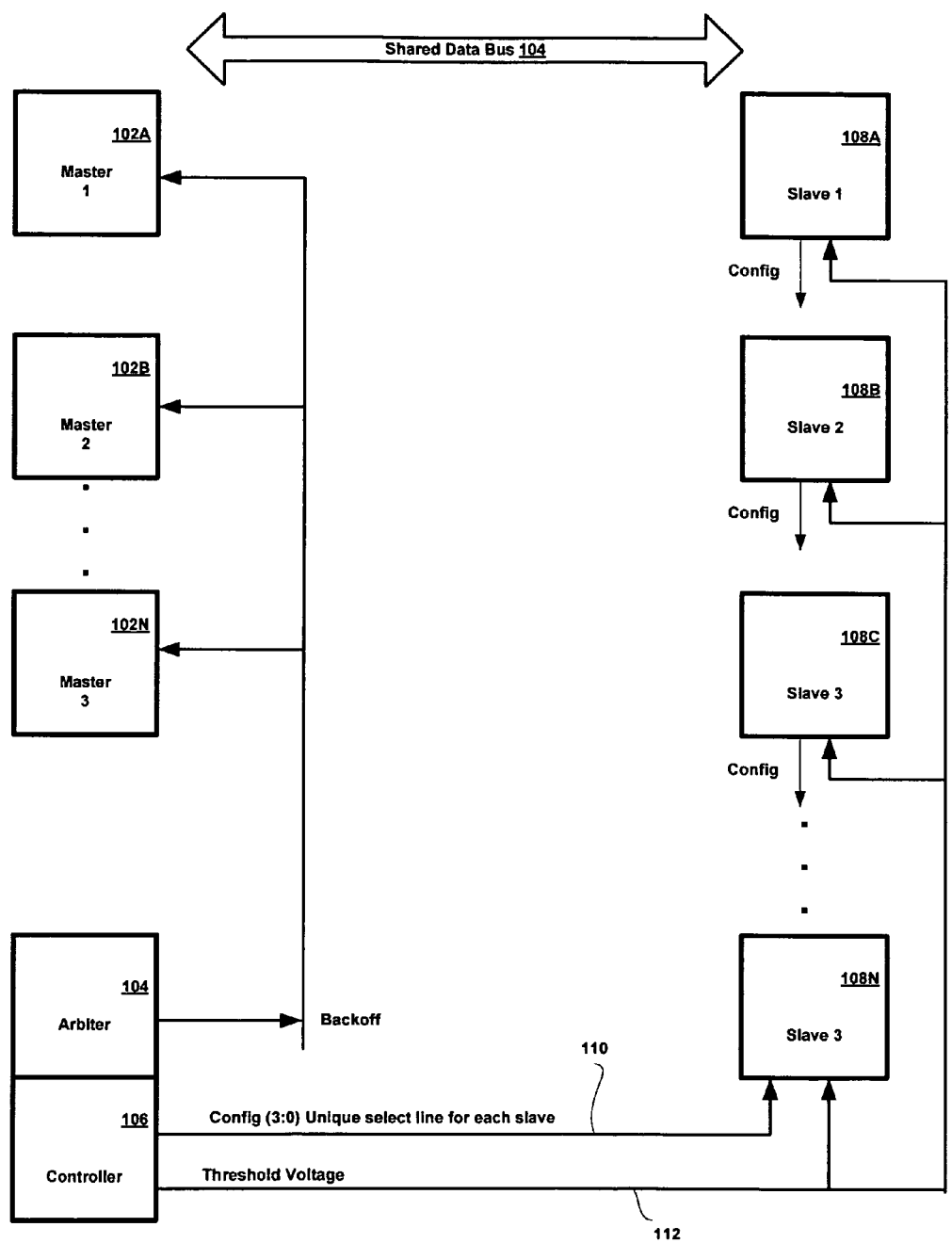
FIG. 1 is a schematic diagram of a computer system of the present invention.

Reference now being made to FIG. 1, a schematic diagram is shown illustrating a computer system 100 having a shared data bus, 114, a plurality of masters 102*a–n*, a plurality of slaves/devices 108*a–n*, an arbiter 104, and a controller 106. The masters 102*a–n* are devices that are transmitting data on the bus to a particular slave or slaves 108*a–n*. The arbiter 104 serves the traditional role of an arbiter in that the masters 102*a–n* send their requests to the arbiter 104, and it prioritizes these requests and submit them for execution.

Each one of the slaves 108*a–n* receives configuration 110 and threshold 112. The controller 106 uses the configuration 110 signal to select one or more of the slaves 108*a–n* for programming, and the threshold 112 signal to indicate the particular voltage level for which the selected slave(s) 108*a–n* should respond. The programming of the slaves 108*a–n* can be either dynamic or static. Mainly, the slaves 108*a–n* can either be initialized once for all transactions, or programmed for each master on an as needed basis. After the controller 106 has programmed the slaves 108*a–n*, the arbiter 104 notifies a particular master 102*a–n* to that it controls the shared data bus 114. The notification from the arbiter 104 can be accomplished in various ways. For example, a grant signal can be provided from the arbiter 104, or an implicit method of snooping adopted where the master 102*a–n* snoops the controller 106 as it programs the slaves 108*a–n*. The preferred embodiment used by the masters 102*a–n* for transmitting data is explained in connection with FIG. 2.

Figure 2:
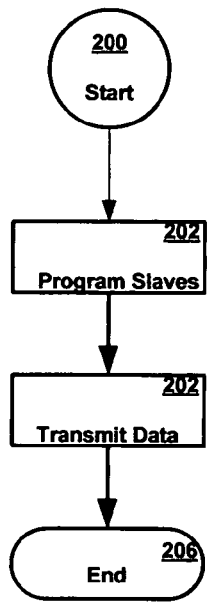
FIG. 2 is a flow diagram illustrating the steps used by the masters for transmitting data on the shared data bus according to the teachings of the present invention.

Reference now being made to FIG. 2, a flow chart is shown illustrating the steps used by the masters 102*a–n* of FIG. 1 for transmitting data on the shared data bus 114 according to the teachings of the present invention. As previously explained, each of the slaves 108*a–n* can either be programmed at initialization or during each required transaction by a particular master 102*a–n* (step 202). Once the slaves 108*a–n* have been programmed to receive data at a particular voltage level, the selected master 102*a–n* transmits the data at a predetermined voltage level on the shared data bus 114 (steps 206–208).

In an alternative embodiment, the masters 102*a–n* could each share a common voltage level signal line that would coupled to each one of the slaves 108*a–n*, in lieu of transmitting the voltage level with the data. In this alternative embodiment, the masters 102*a–n* would transmit the voltage level signal to each one of the slaves prior to transmitting any data on the shared data bus 114. The response of the slaves 108*a–n* is explained in connection with FIG. 3.

Figure 3:
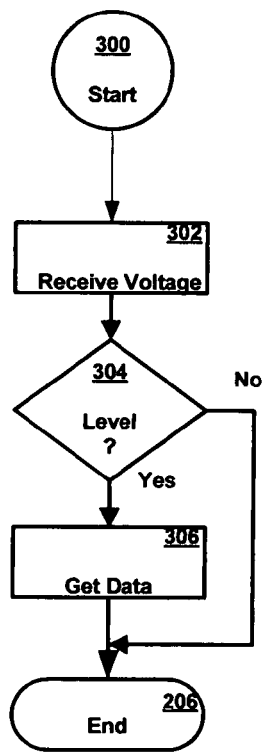
FIG. 3 is a flow chart illustrating the method used by the slaves for receiving data on the shared data bus according to the teachings of the present invention.

Reference now being made to FIG. 3, a flow chart is shown illustrating the method used by the slaves 108*a–n* for receiving data on the shared data bus 114 of FIG. 1 according to the teachings of the present invention. Upon detecting a voltage level on the bus voltage signal 116, each of the slaves 108*a–n* compares the received voltage to their programmed voltage level (steps 302–304). If the received voltage level is within their programmed voltage level, then the slave 108*a–n* accepts the data from the shared data bus 114 (step 306). If the received voltage level is not within their programmed voltage level, then the slave 108*a–n* does not accept the data.

In the alternative embodiment where the masters 102*a–n* transmit a voltage level signal to each one of the slaves 108*a–n*, the slaves which each receive the voltage level signal at 302, and if the voltage level signal is within the voltage range of their programmed voltage level, then the slave 108*a–n* accepts the data from the shared data bus 114 (steps 304–306). If, however, the voltage level signal is not within the voltage range of their programmed voltage level, then the slave 108*a–n* does not accept the data.

An example of the interaction between the controller 106, masters 102*a–n*, and slaves 108*a–n* are provided below in connection with FIG. 4 to further illustrate the advantages of the present invention.

Figure 4:
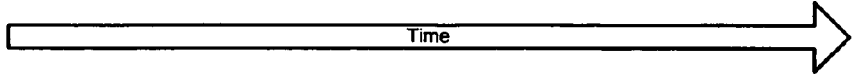
FIG. 4 is a chart is shown illustrating the interaction between the controller, masters, and slaves according to an example of how the present invention can be used.

Reference now being made to FIG. 4, a chart is shown illustrating the interaction between the controller 106, masters 102*a–n*, and slaves 108*a–n* according to an example of how the present invention can be used. FIG. 4 illustrates the programming of slaves 108*a–n* over time for masters 102*a–n* over time. In this particular example, the slaves where dynamically programmed by the controller 106 for receipt of data by each master 108*a–n*. It should be noted that the slaves 108*a–n* could have been initialized in this manner prior to any transfer of data.

It should be apparent from the chart in FIG. 4 that the present invention allows multiple masters 102*a–n* to transfer differing data to one or more slaves 108*a–n* simultaneously. For example, assume that slaves 108*a–c* have had their programmed voltage levels set between 1.1–1.3 volts, and all slaves after 108*c* thru 108*n* have had their programmed voltage levels set between 0.6–0.8 volts. Now assume that masters 102*a* and 102*b* want to communicate with slaves 108*a–n* simultaneously. In this example, master 102*a* could transmit data between 1.1–1.3 volts to transfer data to both slaves 108*a–c*, and master 102*b* could transmit data between 0.6–0.8 volts to transfer data to all slaves after 108*c* thru 108*n*.

It is thus believed that the operation and construction of the present invention will be apparent from the foregoing description. While the method and system shown and described has been characterized as being preferred, it will be readily apparent that various changes and/or modifications could be made without departing from the spirit and scope of the present invention as defined in the following claims.

The invention claimed is:

1. A communication system comprising:
   a bus to transmit data;
   a first programmable unit to respond to transmitted data only when the voltage level of the transmitted data matches a first programmable voltage level;
   a second programmable unit to respond to transmitted data only when the voltage level of the transmitted data matches a second programmable voltage level;
   a first master to transmit data on the bus at a first voltage level; and
   a second master to transmit data on the bus at a second voltage level.

2. The communication system of claim 1 further comprising:
   a controller unit to set the first programmable voltage level equal to the first voltage and the second programmable voltage level equal to the second voltage.

3. The communication system of claim 2 further comprising:
   a third unit to respond to transmitted data when the voltage level of the transmitted data matches a third programmable voltage level.

4. The communication system of claim 2 wherein the controller unit includes:
   circuitry to set the third programmable voltage level equal to the first voltage.

5. The communication system of claim 3 further comprising:
   a fourth unit to respond to transmitted data when the voltage level of the transmitted data matches a fourth programmable voltage level.

6. The communication system of claim 5 wherein the controller unit includes:
   circuitry to set the fourth programmable voltage level equal to the second voltage level.

7. The communication system of claim 6 wherein the controller unit includes:
   circuitry to set the first programmable voltage level equal to either the first or second voltage level and to set the second programmable voltage level equal to either the first or second voltage level.

8. A method of communicating data, the method comprising the steps of:
   transmitting data at a first voltage level;
   responding to data received at a first unit only when the voltage level of the data matches a first reference voltage; and
   responding to data received at a second unit only when the voltage level of the data matches a second reference voltage.

9. The method of claim 8 further comprising the step of:
   transmitting data at a second voltage level.

10. The method of claim 9 further comprising the steps of:
    setting the first reference voltage equal to the first voltage level; and
    setting the second reference voltage equal to the second voltage level.

11. The method of claim 10 further comprising the step of:
    setting the first reference voltage equal to the second voltage level.

12. The method of claim 10 further comprising the step of:
    responding to transmitted data received at a third unit when the voltage level of the transmitted data equals a third reference voltage.

13. The method of claim 12 further comprising the step of:
    setting the third reference voltage equal to the second voltage level.

14. The method of claim 13 further comprising the step of:
    setting the third reference voltage equal to the first voltage level.

15. An apparatus for communicating data comprising:
    means for transmitting data at a predetermined voltage level;
    means for responding to data received at a first unit only when the predetermined voltage level of the data matches a first reference voltage; and
    means for responding to data received at a second unit only when the predetermined voltage level of the data matches a second reference voltage.

16. The apparatus of claim 15 wherein the means for transmitting includes:
   means for transmitting a first portion of data at a first voltage level; and
   means for transmitting a second portion of data at a second voltage level.

17. The apparatus of claim 16 further comprising:
   means for setting the first reference voltage equal to the first voltage level; and
   setting the second reference voltage equal to the second voltage level.

18. The apparatus of claim 17 further comprising:
   means for setting the first reference voltage equal to the second voltage level.

19. The apparatus of claim 15 wherein the predetermined voltage is equal to a first voltage level.

* * * * *